F. H. ROYCE.
GUDGEON PIN LOCKING DEVICE.
APPLICATION FILED SEPT. 19, 1916.
1,222,802.
Patented Apr. 17, 1917.
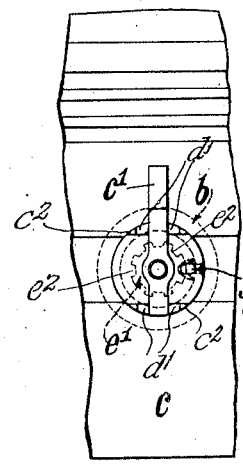
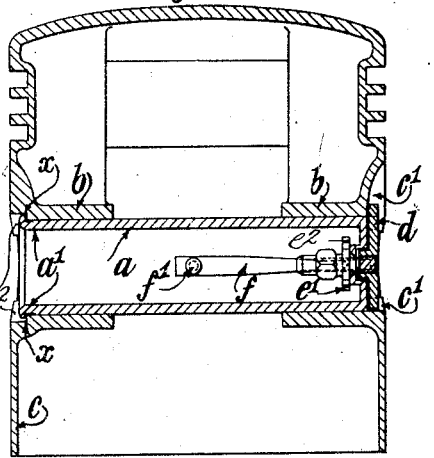
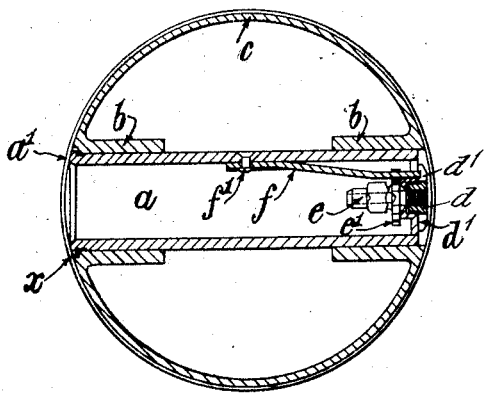
Inventor:
Frederick Henry Royce
by R. Haddan
his Attorney

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

GUDGEON-PIN-LOCKING DEVICE.

1,222,802.  Specification of Letters Patent.  Patented Apr. 17, 1917.

Application filed September 19, 1916.  Serial No. 121,069.

*To all whom it may concern:*

Be it known that I, FREDERICK HENRY ROYCE, a subject of the King of England, residing at Derby, in England, have invented certain new and useful Improvements in Gudgeon-Pin-Locking Devices, of which the following is a specification.

This invention relates to improvements in means for securing gudgeon-pins for instance for those pistons of internal combustion engines, and more particularly engines for motor vehicles, aeroplanes and the like which are usually fitted with pistons of light construction having thin walls.

The primary object of the invention is to prevent the body or walls of the piston being distorted by the fixing device of the gudgeon pin; and a further object is to provide a locking mechanism which is capable of being made of extremely light weight.

In the accompanying drawings, which illustrate by way of example the manner in which this invention is applied to a motor vehicle engine piston:—

Figure 1 is a sectional elevation of the piston,

Fig. 2 is a broken view in end elevation of the piston showing the locking device for the gudgeon pin, and Fig. 3 is a sectional plan through the gudgeon pin.

In all the views similar parts are marked with like letters of reference.

The hollow gudgeon-pin $a$ is shown fitted into the usual type of bosses $b$ formed integral with the piston $c$, the gudgeon pin being suitably shaped at one end to allow of fixing the locking device, while at the opposite end a suitable shoulder $a^1$ is formed for positioning the gudgeon-pin endwise, said shoulder engaging a recess $a^2$ in the piston.

The locking device consists of a member or plate $d$ having lateral tongues $d^1$ fitted across one end of the gudgeon-pin and tapped to accommodate a screw or set pin $e$. The tongued member $d$ is fixed into slots $c^1$ formed in the piston $c$ and also slots or the equivalent $c^2$ formed in the end of the gudgeon-pin. When the screw or set pin $e$ and tongued member $d$ are in position, the gudgeon pin is prevented from rotating, and is only allowed a small predetermined amount of endwise movement.

Any suitable device may be used to lock the screw or set pin $e$ but I prefer the one shown in the accompanying drawings wherein a flange $e^1$ is formed integral with the set pin $e$ this flange being slotted around its periphery as at $e^2$ to accommodate the end of a spring finger $f$, which spring finger is fixed to the gudgeon pin by means of the rivet $f^1$. The spring finger $f$ is arranged to press against and drop into one of the slots $e^2$ formed in the flange $e^1$, thus making it impossible for the screw or set pin $e$ to turn until the end of the spring finger $f$ which projects through the gudgeon pin $a$ is brought out of engagement with the slotted flange $e^1$. The screw or set pin may be turned by means of a box or tube spanner inserted from the open end of the gudgeon-pin.

It should be observed that a clearance $x$ is left between the inside of the shoulder $a^1$ of the gudgeon-pin and the piston $c$, the object of this being to allow the gudgeon pin to float between certain small predetermined limits, and in this manner to prevent the gudgeon pin securing device from distorting the piston.

What I claim as my invention and desire to secure by Letters Patent of the United States is:—

1. The combination with a piston having exterior recesses, of a hollow gudgeon-pin extending through said piston and having recesses at one end, and a shoulder at the opposite end thereof, and a locking plate adapted to engage the recesses in the gudgeon-pin and the recesses in the piston.

2. In a piston, the combination of a hollow gudgeon-pin having recesses at one end, there being a recess in the piston coöperating therewith, of a locking member, tongues on the locking member adapted to engage said recesses, a screw adapted to secure the locking member to the gudgeon pin, and means within the pin for locking said screw against rotation.

3. In a piston, the combination of a hollow gudgeon-pin having recesses at one end, there being a recess in the piston coöperating therewith, of a locking member, tongues on the locking member adapted to engage said recesses, a screw adapted to secure the locking member to the gudgeon-pin, said screw having a slotted portion and a resilient device secured within the gudgeon-pin adapted to engage said slotted portion for locking said screw against rotation.

4. The combination with a piston having exterior recesses in its wall, of a hollow gudgeon-pin extending transversely through said piston, having a shoulder at one end engaging certain of said piston recesses, a locking plate at the opposite end of said gudgeon pin engaging others of said piston recesses, means for attaching the locking plate to the gudgeon-pin and devices within the gudgeon-pin for locking said securing means.

5. The combination with a piston having exterior recesses in its wall, of a hollow gudgeon-pin extending transversely through said piston, having a shoulder at one end engaging certain of said piston recesses, a locking plate at the opposite end of said gudgeon pin engaging others of said piston recesses, means for preventing relative rotation between said locking plate and pin, a screw within the pin for attaching the locking plate to the pin, a slotted flange on the screw and a spring finger secured within the pin adapted to engage said slotted flange to secure the screw against rotation.

In witness whereof I have signed this specification in the presence of two witnesses.

FREDERICK HENRY ROYCE.

Witnesses:
ALBERT GEORGE ELLIOTT,
LORAL MABEL WOLVERSON.